United States Patent

Frerichs et al.

[11] Patent Number: 6,067,756
[45] Date of Patent: May 30, 2000

[54] SPACE SAVING ROOM EXTENDER

[75] Inventors: Marc Edward Frerichs, Davenport; Paul Edmund Hanser, Tipton, both of Iowa

[73] Assignee: HWH Corporation, Moscow, Iowa

[21] Appl. No.: 09/138,550

[22] Filed: Aug. 24, 1998

[51] Int. Cl.[7] .................................................. E04B 1/343
[52] U.S. Cl. ................................ 52/67; 52/115; 52/118; 296/26.09; 296/26.13
[58] Field of Search ............................. 52/67, 115, 118; 296/26.08, 26.09, 26.12, 26.13, 171, 175

[56] References Cited

U.S. PATENT DOCUMENTS

| | | | |
|---|---|---|---|
| 3,572,812 | 3/1971 | Norcia | 52/67 X |
| 3,797,880 | 3/1974 | Pezzaglia | 52/67 X |
| 4,312,159 | 1/1982 | Paul | 52/67 X |
| 4,689,924 | 9/1987 | Jurgensen | 52/67 |
| 5,154,469 | 10/1992 | Morrow | 296/26 |
| 5,237,782 | 8/1993 | Cooper | 52/67 |
| 5,491,933 | 2/1996 | Miller et al. . | |
| 5,634,683 | 6/1997 | Young | 296/165 |
| 5,894,698 | 4/1999 | Dewald, Jr. et al. | 52/67 |

*Primary Examiner*—Carl D. Friedman
*Assistant Examiner*—Phi Dieu Tran A
*Attorney, Agent, or Firm*—James C. Nemmers

[57] ABSTRACT

A space-saving, single-cylinder, room extender, this invention consists of a hydraulic cylinder, electrically powered screw auger or other electrically powered means is nested within an inner structural member that is, in turn, telescopically nested within an central beam. Further, the nested structural members form an integral part of the structure of the expandable room being embedded within the floor of the room, or being embedded within the structural frame of an accessory within the room. Low friction shims hold the inner structural member within the central beam such that lateral motion is minimized while the telescopic motion of central beam relative to the inner structural member is smooth.

8 Claims, 4 Drawing Sheets

SPACE SAVING ROOM EXTENDER

BACKGROUND OF THE INVENTION

The present invention relates generally to expandable rooms. More particularly, this invention relates to room structures that are telescopically slidable between retracted and expanded positions.

Various vehicles are known which have rooms or room portions that may be adjusted between expanded and retracted positions in order to provide more or less internal space as desired. Typically, one portion of the room is movable and telescopically received or nested within a portion of the room that remains fixed. Similar structures can be used effectively in static structures, although for convenience, this discussion focuses primarily on vehicular examples.

When the vehicle is in motion, the room typically remains in a retracted position. This arrangement provides adequate space to accommodate users in transit and yet remain within vehicle width limitations. When the vehicle is stopped for a length of time, however, it is often desirable to increase the size of internal accommodations. At that point, the user may slide the movable, nested portion of the room out to its expanded position.

These movable room portions usually include a floor, a roof, a side wall, and one or more end walls. In the retracted position, the roof, floor, and end walls are typically concealed from exterior view and the room side wall forms a portion of the vehicle side wall. At the same time, the floor of the movable portion of the room typically rests above the floor of that portion of the room that remains fixed and may form a usable portion of the interior floor during vehicle transit. Similarly, the ceiling of the movable portion of the room may define the interior ceiling of that part of the vehicle during transit.

Room extenders common in the prior art have utilized folding, jointed structural arms. Such arms may fold and unfold in a plane perpendicular to the floor of the recreational vehicle or coach. For example, one version of such an extender utilizes folded arms hidden within built-in furniture. Other extenders have included jointed structural arms that fold and unfold in a plane parallel to the floor of the extendable room and occupy a space between the beams that support the extendable room.

Additional designs have included telescopically extendable tubes or beams driven by rack and pinion mechanisms or hydraulic cylinders. Such designs have utilized multiple parallel tubes or beams to attain stability in the extended position and throughout room expansion. Such designs have traditionally demanded the use of under floor space to accommodate the multiple tubes or beams as well as the separate drive mechanisms. Alternatively, such designs have demanded use of above floor space.

Because, when retracted, the vehicle must accommodate the movable portion of the room that is nested within the fixed portion of the room, the movable portion utilizes a portion of the available storage space within the vehicle. Further use of vehicle space includes under floor space to accommodate the support structure and drive mechanisms for extending, supporting, and stabilizing the movable portion of the room. Useable space is valuable in this type of vehicle. There is therefore a need for support structures and slide out mechanisms that allow the smooth and stable extension of the movable portion of such rooms while minimizing the amount of vehicle space used when the movable portion is retracted.

It is therefore the principal object of this invention to provide a space saving, single cylinder, telescopically nested hydraulic room extender that allows smooth and stable extension of rooms with minimal use of valuable vehicle space. Further objects include the provision of a room extender with a hydraulic drive mechanism nested within structural members of the room extender which, in turn, form an integral part of the structure of the room floor.

The present invention is a space saving, single cylinder, hydraulic room extender providing for the smooth extension of the movable portion of an expandable room with a minimal loss of valuable vehicle space. Use of an electrical screw auger or other electrical actuation means may also be employed. The invention further provides for room extension, minimizing the use of valuable interior and under floor space, creating a room with a stable and solid feel while allowing a minimal amount of lateral motion.

SUMMARY OF THE INVENTION

This invention comprises an expandable room in which a hydraulic cylinder or electrical actuation means that expands and retracts the movable portion of the expandable room is nested within an inner structural member that is, in turn, telescopically nested within a central beam that supports the movable portion. The nested structural members form an integral part of the structure of the expandable room being embedded within the floor of the room. Low friction shims hold the inner structural member secure within the central beam such that lateral movement of the moveable portion is minimized while the telescopic motion of the central beam relative to the inner structural member is smooth. The invention is especially suitable for expandable rooms for vehicles, such as recreational vehicles and the like.

DESCRIPTION OF THE PREFERRED EMBODIMENT OF THE INVENTION

Figure 1:
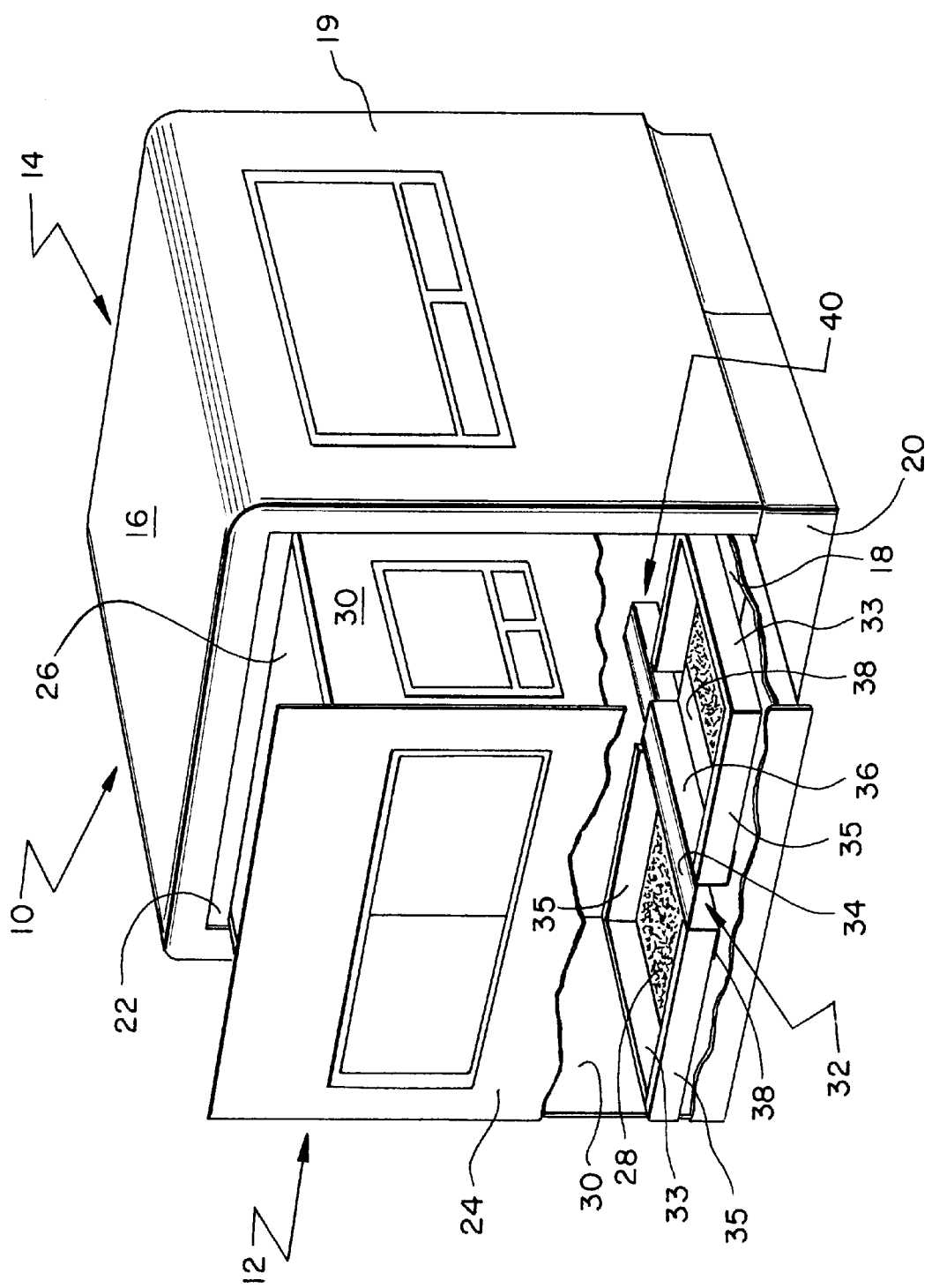
FIG. 1 is a perspective view illustrating an expandable room utilizing the principles of the invention.

FIGS. 1 through 5 show a preferred embodiment of the expandable room 10 of the present invention with FIG. 1 showing the movable portion 12 in the extended position in which portion 12 extends outwardly from the room 10. The movable portion 12 nests within a receiving portion 14. The receiving portion 14 is comprised of a top wall 16, a bottom wall or floor 18 parallel to and below the top wall 16, end walls 19 and a generally vertical side wall 20 connecting the top wall 16 and floor 18. Side wall 20 contains a generally rectangular opening 22 to receive the movable portion 12.

The nesting movable portion 12 is comprised of a side wall 24 generally parallel to the side wall 20 of the receiving portion 14, the side wall 24 being connected to a top wall 26 that is generally parallel to and spaced below the top wall 16 of the receiving portion 14. The side wall 24 of the movable portion 12 is connected to a floor 28 that is generally parallel to and mounted at a level above the floor 18 of the receiving portion 14. The side wall 24, top wall 26, and floor 28 of the movable portion 12 each are connected to two spaced apart end walls 30 that are parallel to one another thus forming a generally rectangular and three-dimensional five-walled nesting movable portion 12 that has an open side parallel to the side wall 24 and facing the side wall 20 of the receiving portion 14.

Figure 2:
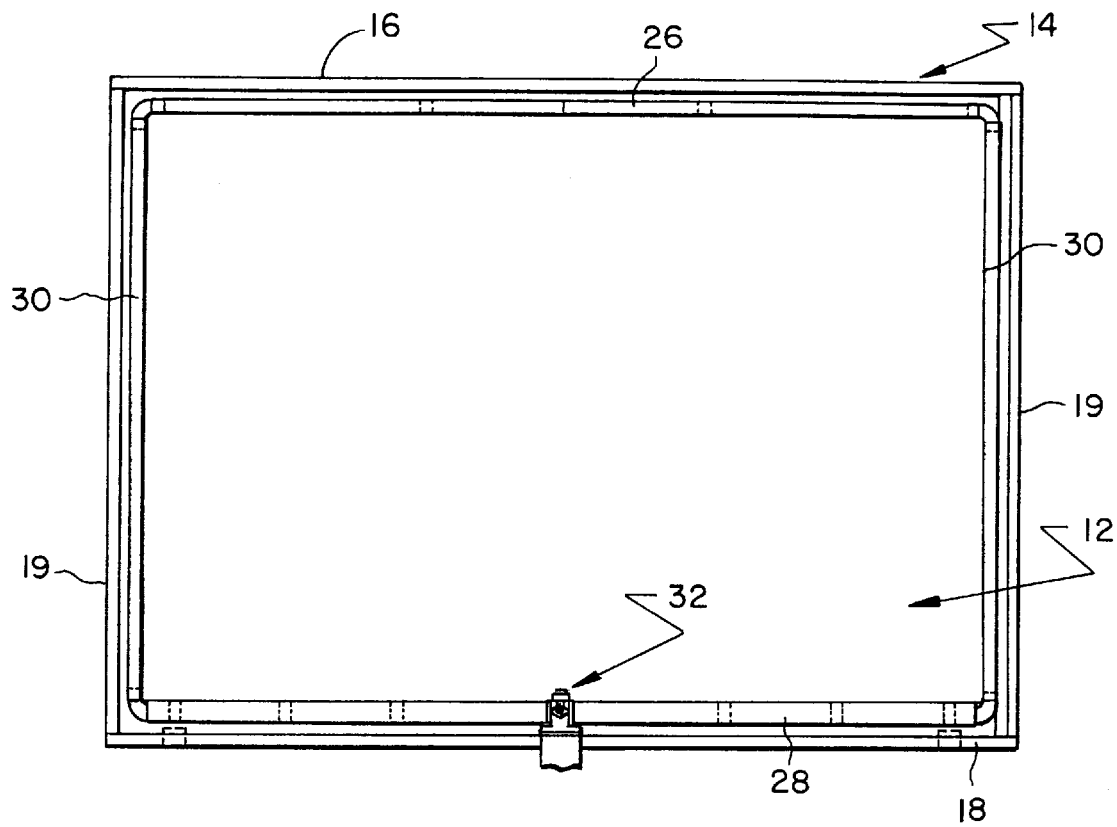
FIG. 2 is an end view of the hydraulic room extender within an end view of the movable portion of the extendable room shown nested within an opening in the frame of the room.
Figure 3:
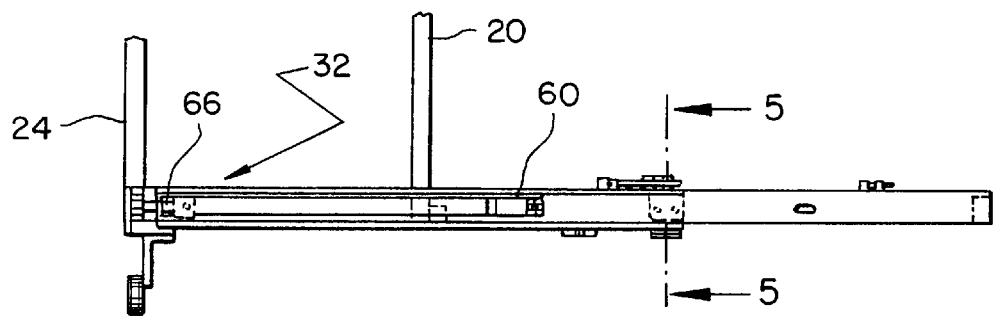
FIG. 3 is a side elevational view showing the hydraulic room extender for the movable room showing the extender in a retracted position.
Figure 4:
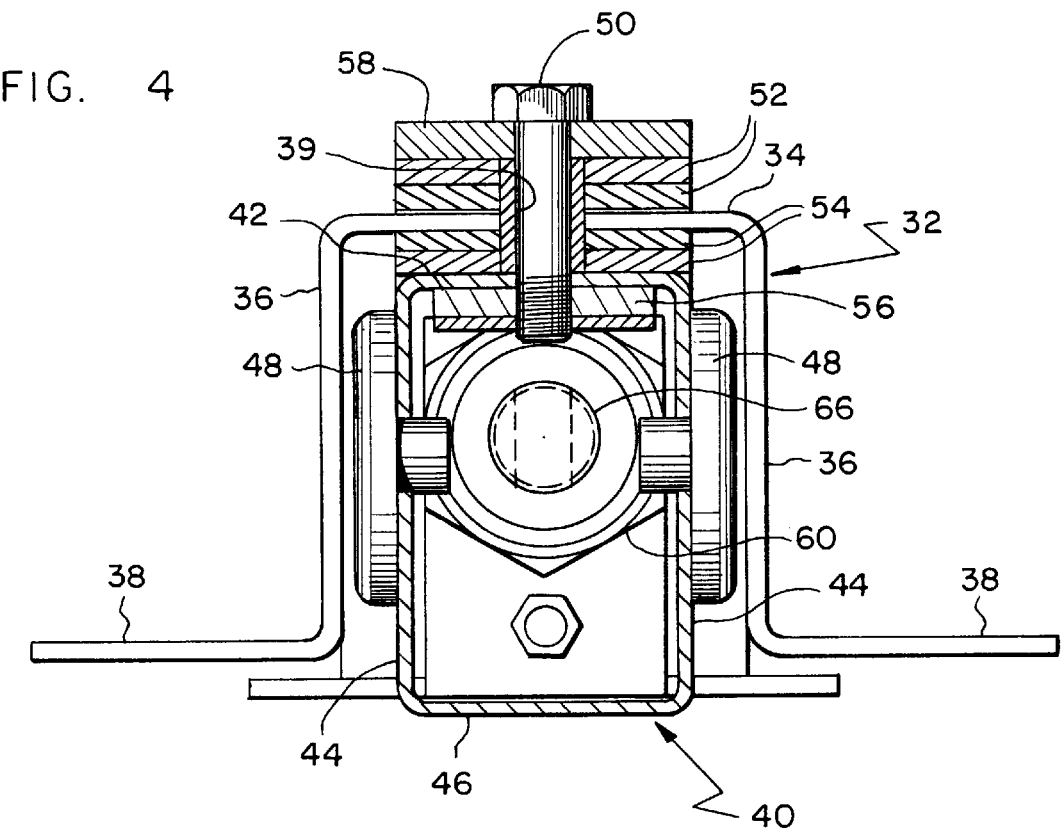
FIG. 4 is an enlarged end view of the hydraulic room extender shown in FIG. 2.
Figure 5:
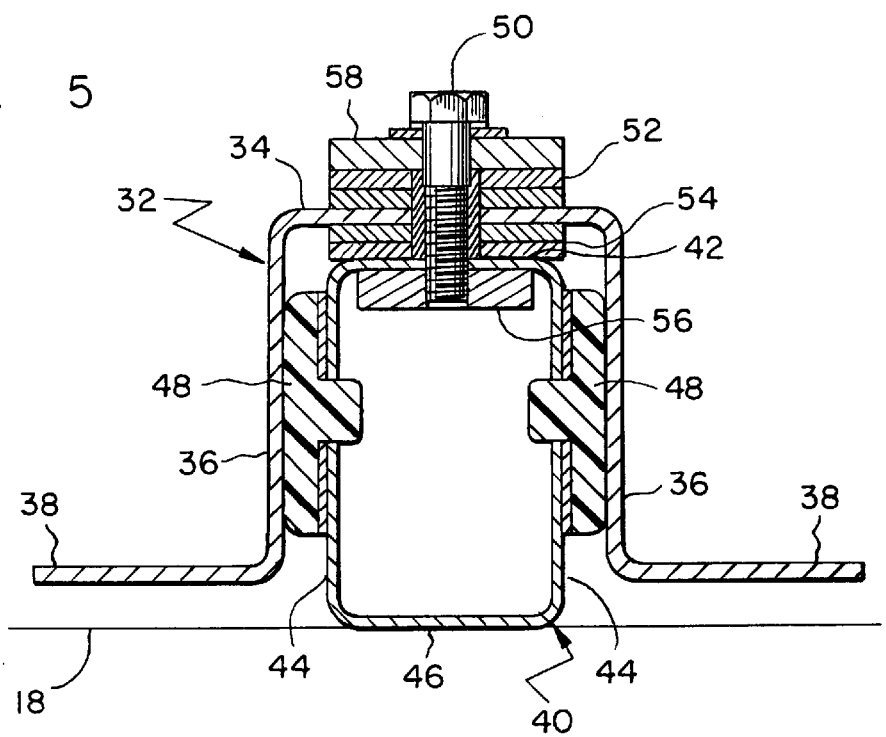
FIG. 5 is a sectional view of the hydraulic room extender taken on the line 5—5 of FIG. 3.

FIGS. 1, 2 and 3 show the floor 28 of the movable portion 12 having a central beam 32 which serves as one of the support beams 33 of the movable portion 12. Beams 32 and 33 are connected to cross beams 35 to form the structure of floor 28. The central beam 32 has a top flange 34 connected to two spaced-apart vertical webs 36 that extend downward and engage two bottom flanges 38 that are generally parallel to the top flange 34. This structure provides a central beam section having a cross sectional shape generally similar to an inverted "U" having outwardly flared bottom flanges 38. FIG. 1 shows the central beam 32 having a longitudinal axis parallel to the end walls 30 of movable portion 12 and perpendicular to and engaging the side wall 24. As best seen in FIGS. 4 and 5, the top flange 34 of central beam 32 has an open, slot-type channel 39 running generally parallel to the longitudinal axis of the central beam 32.

The means for extending and retracting the movable portion 12 includes an inner structural member 40 having a top wall 42 that engages two spaced-apart vertical walls 44 that extend downward and are connected to a bottom wall 46, thus forming a hollow tube that has a generally rectangular cross sectional shape. The bottom flange 46 of the inner structural member 40 is affixed by welding or other suitable mounting means to the floor 18 of the receiving portion 14. The inner structural member 40 is nested within the central beam 32 and has exterior dimensions less than the inner dimensions of the beam 32 so that a void spaces are created between the top flange 42 of the inner structural member 40 and the top flange 34 of the central beam 32 and between the vertical walls 44 of member 40 and the vertical webs 36 of beam 32. A shim 48 comprised of a durable and low friction material is connected in any suitable manner to each wall 44 of member 40 so as to engage the inner surfaces of the vertical webs 36 of the central beam 32.

As best seen in FIGS. 4 and 5, a bolt or other connecting device such as pin 50 extends downward through the open, slot-type channel 39 in the top flange 34 of beam 32 connecting the with top wall 42 of inner structural member 40. An outer shim 52 engages and rides upon the top of the top flange 34, the shim 52 being held in place by the pin 50. Similarly, an inner shim 54 engages and is positioned between the top flange 34 and the top wall 42 of central beam 40. The inner shim 40 is also held in place by the pin 50. An inner cap 56 engages with the interior surface of the top wall 42 and an outer cap 58 engages with the outer shim 52 to complete the fastening of the shims 52 and 54 by the pin 50.

Figure 6:
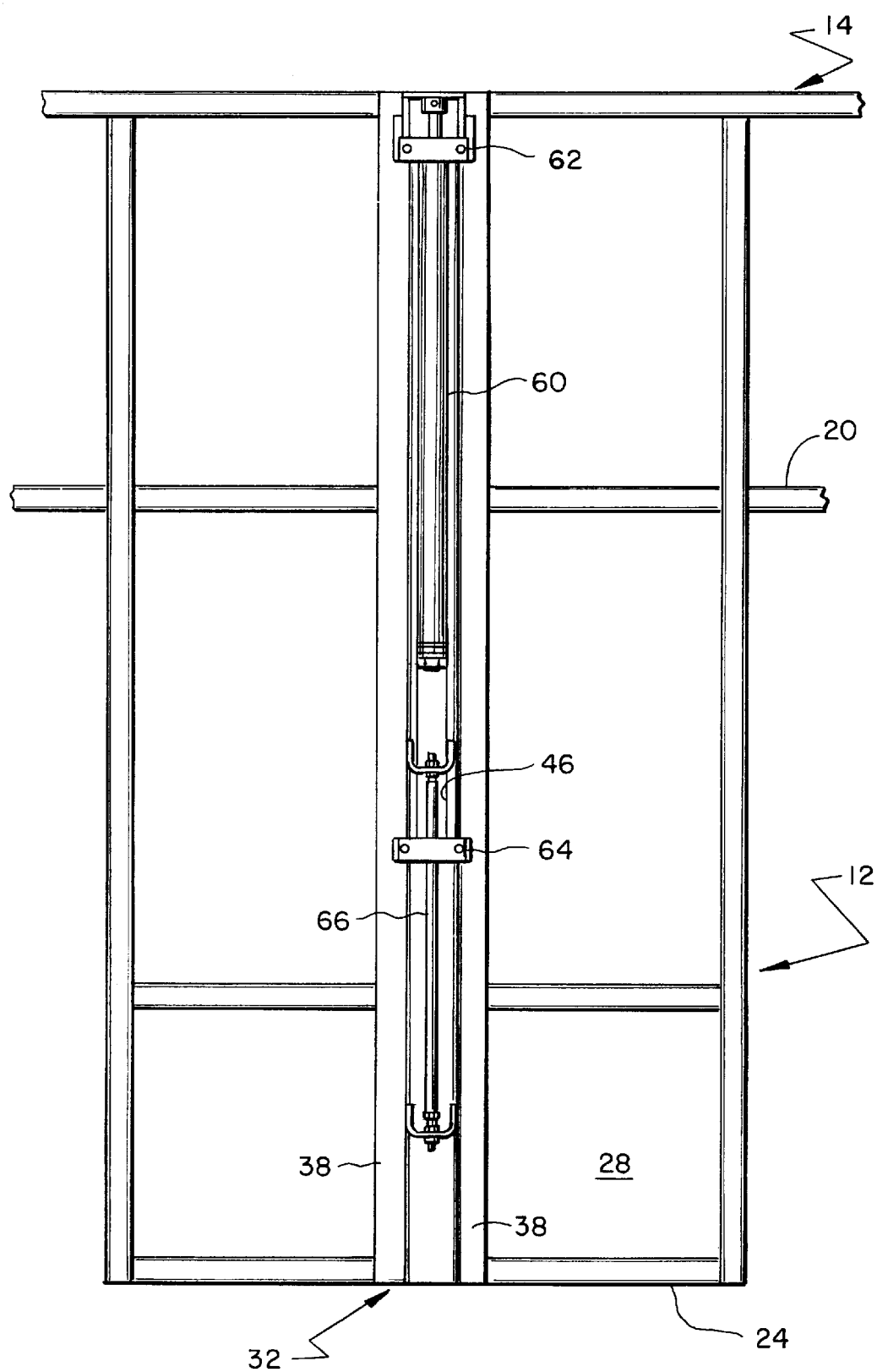
FIG. 6 is a top or plan view of the hydraulic room extender.

As best seen in FIGS. 3, 4 and 6 a hydraulic cylinder 60 is longitudinally nested within the inner structural member 46 and is affixed by mounting means 62 and 64 to the central beam 46. The operating rod 66 of hydraulic cylinder 60 is affixed to the inner structural member 32.

The operation and use of the single cylinder hydraulic room extender should be evident from the foregoing description. This configuration allows the central beam 32 and consequently the movable portion 12 of the extendable room 10 to move back and forth relative to the receiving portion 14 as the hydraulic cylinder 60 is operated. The side shims 48 minimize lateral motion of and guide the central beam 32 relative to the inner structural member 40. The pin 50 that secures the inner shim 52 and outer shim 54 and travels in the channel 39 in the top wall 34 of the central beam 32, serves as an additional guide as the moving central beam 32 slides over the inner structural member 40. The pin 50 and the inner and outer shims 52 and 54 further serve to restrain the vertical displacement of the central beam 32 relative to the inner member 40.

The nested hydraulic cylinder 60 and the telescopically nested central beam 32 and structural member 40 occupy very little vehicle space as the central beam 32 serves as a necessary structural floor beam in the movable portion 12 of the expandable room 10. The side shims 48 and inner and outer shims 52 and 54 ensure smooth and stable motion as the central beam 32 slides relative to the inner structural member 40. In this manner, the nested, single-cylinder hydraulically driven expandable room accomplishes the objects of the invention.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is as follows:

1. A nested expandable room in combination with a fixed room having a fixed room bottom wall and having a fixed room side wall with an opening therein to receive the nested expandable room said combination comprising:

a expandable room side wall being generally parallel to the fixed room side wall;

an expandable room bottom wall having a central beam therein and engaging and being generally perpendicular to the expandable room side wall;

said central beam engaging the expandable room side wall and having a longitudinal axis, said axis being generally perpendicular to the expandable room side wall, and said central beam having an opening therein parallel to the longitudinal axis;

an inner structural member being telescopically nested within the central beam and having a longitudinal axis;

said longitudinal axis being generally parallel to the central beam longitudinal axis;

said inner structural member engaging and being mounted to the fixed room bottom wall;

an actuation means having a body and a shaft defining a longitudinal axis;

said shaft being telescopically nested within said body, and said body being mounted within the inner structural member with said actuation means longitudinal axis being generally parallel to the inner structural member longitudinal axis;

said actuation means shaft having a front end, said front end extending longitudinally from the actuation means body and said front end being mounted to the expandable room side wall;

a plurality of shims being mounted to the inner structural member and extending from the inner structural member to the central beam;

a connecting means having a mounting pin and an outer cap, said mounting pin being mounted to the inner structural member, extending through the opening in the central beam, and being mounted to the outer cap.

2. The invention of claim 1 wherein the actuation means is hydraulically powered.

3. The invention of claim 1 wherein the actuation means is electrically powered.

4. The invention of claim 1 with said expandable room comprising:

a top wall, a bottom wall, a side wall, and two end walls, said walls joined to form a generally rectangular box defining an interior space and having an open side.

5. The invention of claim 1 with said central beam comprising:

a front bottom flange with front and back edge, a back bottom flange with a front and back edge, a front vertical web with a top and bottom edge, a back vertical web with a top and bottom edge, and a top flange with a front and back edge, said front bottom flange back edge engaging the front vertical web bottom edge, said front vertical web top edge engaging the top flange front edge, said top flange back edge engaging the back vertical web top edge, said back vertical web bottom edge engaging the back bottom flange front edge.

6. The invention of claim 1 with said inner structural member comprising:

a bottom flange with a front edge and a back edge, a top flange with a front edge and a back edge, a front vertical web with a top edge and a bottom edge, and a back vertical web with a top edge and a bottom edge, said bottom flange front edge engaging the front vertical web bottom edge, said front vertical web top edge engaging the top flange front edge, said top flange back edge engaging the back vertical web top edge, and said back vertical web bottom edge engaging the bottom flange back edge.

7. The invention of claim 1 with said inner structural member comprising:

a tube having a generally rectangular cross section.

8. The invention of claim 1 with the connecting means comprising:

an outer shim, said outer shim being positioned between and engaging the central beam and the outer cap;

an inner shim, said inner shim being positioned between and engaging the central beam and the inner structural member, said inner shim being mounted on the inner structural member;

said mounting pin having a shaft with a cap with said mounting pin cap joined to said shaft;

said mounting pin cap engaging said outer cap, and said shaft extending through said outer cap, outer shim, central beam, inner shim, and inner structural member;

an inner cap, said inner cap engaging and being mounted within the inner structural member, said inner cap engaging and being mounted to said mounting pin shaft.

* * * * *